United States Patent
Zhang et al.

(10) Patent No.: US 12,237,542 B2
(45) Date of Patent: Feb. 25, 2025

(54) ELECTROCHEMICAL DEVICE AND ELECTRONIC DEVICE CONTAINING THE SAME

(71) Applicant: Ningde Amperex Technology Limited, Fujian (CN)

(72) Inventors: Nan Zhang, Fujian (CN); Yibo Zhang, Fujian (CN); Kun Yan, Fujian (CN); Qiaoshu Hu, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 471 days.

(21) Appl. No.: 17/710,131

(22) Filed: Mar. 31, 2022

(65) Prior Publication Data
US 2022/0223982 A1    Jul. 14, 2022

Related U.S. Application Data

(63) Continuation of application No. PCT/CN2020/112679, filed on Aug. 31, 2020.

(51) Int. Cl.
*H01M 50/529*    (2021.01)
*H01M 50/112*    (2021.01)
(Continued)

(52) U.S. Cl.
CPC ....... *H01M 50/529* (2021.01); *H01M 50/112* (2021.01); *H01M 50/172* (2021.01);
(Continued)

(58) Field of Classification Search
CPC ............. H01M 50/529; H01M 50/112; H01M 50/172; H01M 50/186; H01M 50/193;
(Continued)

(56) References Cited

U.S. PATENT DOCUMENTS

| 9,331,358 B2 | 5/2016 | Bhardwaj et al. |
| 9,917,325 B2 | 3/2018 | Bhardwaj et al. |
(Continued)

FOREIGN PATENT DOCUMENTS

| CN | 201838680 U | 5/2011 |
| CN | 201927677 U * | 8/2011 |
(Continued)

OTHER PUBLICATIONS

English Translation of CN106532105A—Internal series soft package lithium ion battery and preparation method thereof; Shandong Goldencell electronics tech co Ltd; Mar. 22, 2017 (Year: 2017).*

(Continued)

*Primary Examiner* — Matthew T Martin
*Assistant Examiner* — Adam J Francis
(74) *Attorney, Agent, or Firm* — Maier & Maier, PLLC (57) ABSTRACT

An electrochemical device includes a first electrode assembly, a second electrode assembly, and a packaging shell. The first electrode assembly and the second electrode assembly B are each located in a separate cavity in the packaging shell. Two opposite-polarity tabs of the first electrode assembly and the second electrode assembly are connected in the packaging shell. The connected two opposite-polarity tabs comprise a first tab extending out of the packaging shell. Such design of extending the tabs and the design of ion insulation between the hermetic cavities improve the charge and discharge performance and the product quality of the electrochemical device.

16 Claims, 2 Drawing Sheets

(51) Int. Cl.
*H01M 50/172* (2021.01)
*H01M 50/186* (2021.01)
*H01M 50/193* (2021.01)
*H01M 50/483* (2021.01)
*H01M 50/486* (2021.01)
*H01M 50/533* (2021.01)
*H01M 50/538* (2021.01)
*H01M 50/54* (2021.01)

(52) U.S. Cl.
CPC ....... *H01M 50/186* (2021.01); *H01M 50/193* (2021.01); *H01M 50/483* (2021.01); *H01M 50/486* (2021.01); *H01M 50/533* (2021.01); *H01M 50/538* (2021.01); *H01M 50/54* (2021.01)

(58) Field of Classification Search
CPC ............. H01M 50/483; H01M 50/486; H01M 50/533; H01M 50/538; H01M 50/54; H01M 50/117; H01M 50/121; H01M 50/122
See application file for complete search history.

(56) References Cited

U.S. PATENT DOCUMENTS

| | | | |
|---|---|---|---|
| 10,367,224 B2 | 7/2019 | Bhardwaj et al. | |
| 2015/0155596 A1* | 6/2015 | Gardner | H01M 50/581 429/149 |
| 2016/0020481 A1* | 1/2016 | He | H01M 10/0418 429/185 |
| 2019/0296283 A1* | 9/2019 | Chen | H01M 50/503 |

FOREIGN PATENT DOCUMENTS

| | | | |
|---|---|---|---|
| CN | 202662721 U | | 1/2013 |
| CN | 106532105 A | * | 3/2017 |
| CN | 207183386 U | | 4/2018 |
| CN | 209104258 U | | 7/2019 |
| CN | 110429232 A | * | 11/2019 |
| CN | 209896161 U | | 1/2020 |
| CN | 211208559 U | | 8/2020 |
| KR | 10-2015-0040502 A | | 4/2015 |
| WO | 2013042612 A1 | | 3/2013 |
| WO | 2018163480 A1 | | 9/2018 |

OTHER PUBLICATIONS

English Translation of CN110429232A—Separation plate used for ultra-large capacity lithium ion battery and lithium ion battery; Univ Central South; Nov. 8, 2019 (Year: 2019).*
English Translation of CN201927677U—Internal Series Connection Type lithium battery; Huizhou Desay polypower battery Co Ltd; Aug. 10, 2011 (Year: 2011).*
Extended European Search Report issued on Sep. 28, 2022, in corresponding European Application No. 20950916.5; 6 pages.
Office Action issued on Dec. 13, 2022, in corresponding Japanese Application No. 2021-546816; 8 pages.
Office Action issued on May 16, 2023, in corresponding Japanese Application No. 2021-546816; 4 pages.
Office Action issued on Oct. 3, 2023, in corresponding Japanese Application No. 2021-546816; 5 pages.
International Search Report mailed May 26, 2021, corresponding to International Application No. PCT/CN2020/112679; 8 pages (with English Translation).

* cited by examiner

ELECTROCHEMICAL DEVICE AND ELECTRONIC DEVICE CONTAINING THE SAME

CROSS REFERENCE TO RELATED APPLICATIONS

This application is the Bypass Continuation application of PCT international application: PCT/CN2020/112679 filed on Aug. 31, 2020, the disclosure of which is hereby incorporated by reference in its entirety.

TECHNICAL FIELD

This application relates to the electrochemical field, and in particular, to an electrochemical device and an electronic device containing the same.

BACKGROUND

Lithium-ion batteries are widely used in the field of consumer electronics by virtue of many advantages such as a high energy density, a long cycle life, a high nominal voltage, a low self-discharge rate, a small size, and a light weight. In recent years, with rapid development of electric vehicles (EVs) and portable electronic devices, people are posing higher requirements on the energy density, safety, cycle performance, and the like of the battery, and are expecting the rollout of a new lithium-ion battery with overall performance improved comprehensively.

However, as limited by an inherent electrochemical system, usually the working voltage of a single lithium-ion battery can hardly exceed 5 V. However, in practical use of the lithium-ion battery, high-voltage application scenarios are enormously required, for example, the application scenarios of an electric vehicle (EV), a potential transformer (PT), and an energy storage system (ESS).

To increase the output voltage of the lithium-ion battery, a plurality of lithium-ion batteries are usually serial-connected in existing technologies. However, the serial connection does not implement ion insulation for serial-connected electrochemical cells. Electrolyte decomposition under a high voltage affects the charge and discharge performance of the lithium-ion battery. In addition, the unreasonable quantity of tabs leading out of the lithium-ion battery affects the sealing strength of the lithium-ion battery, and thereby results in a decline of product quality of the lithium-ion battery. Therefore, it is urgent for persons skilled in the art to develop a new lithium-ion battery with a serial-connected structure.

SUMMARY

This application provides an electrochemical device and an electronic device containing the same to improve the charge and discharge performance and the product quality of the electrochemical device.

A first aspect of this application provides an electrochemical device, including a first electrode assembly, a second electrode assembly, and a packaging shell. The first electrode assembly and the second electrode assembly are each located in a separate cavity in the packaging shell. Two opposite-polarity tabs of the first electrode assembly and the second electrode assembly are connected in the packaging shell. The connected two opposite-polarity tabs include a first tab extending out of the packaging shell.

In some embodiments of this application, the connected two opposite-polarity tabs further include a second tab not extending out of the packaging shell.

In some embodiments of this application, 1 mm≤d1≤100 mm, wherein d1 is a length by which the first tab extends out of the packaging shell.

In some embodiments of this application, 0 mm≤d2≤30 mm, wherein d2 is a vertical distance between an end of the second tab and an outer edge of the packaging shell from which the first tab extends out of the packaging shell.

In some embodiments of this application, 5 mm≤d1+d2≤20 mm.

In some embodiments of this application, 2<x≤y−1, where x is a quantity of tabs extending out of the packaging shell and y is a total quantity of tabs.

A second aspect of this application provides an electronic device, including the electrochemical device according to the first aspect of this application.

The electrochemical device provided in this application partitions different electrode assemblies and electrolytic solutions into separate electrochemical cells. Different electrochemical cells are ion-insulated from each other to avoid an internal short circuit of the electrochemical device in a liquid electrolyte environment and prevent electrolyte decomposition under a high voltage, thereby improving the charge and discharge performance and safety performance of the electrochemical device and ensuring effective electrical energy output of the electrochemical device. In addition, the electrochemical device requires very high reliability of manufacturing because the manufacturing involves complicated and meticulous welding and sealing of a plurality of electrode assemblies. The normal working output of the electrochemical device is limited by each electrode assembly. Therefore, troubleshooting is essential during the manufacturing of the electrochemical device. The design of connecting the opposite-polarity tabs inside the packaging shell and retaining one of the tabs inside the packaging shell can effectively increase the sealing strength and the sealing reliability. In addition, voltage can be monitored for a single electrochemical cell, thereby facilitating quick locating of a faulty electrode assembly and identification of the failure cause and improving the manufacturing yield rate and production efficiency of the electrochemical device. In addition, the risk of energy density loss is mitigated, and the material of the electrochemical device is conserved to reduce cost and increase the market competitiveness of the electrochemical device.

BRIEF DESCRIPTION OF DRAWINGS

To describe the technical solutions in the embodiments of this application or the prior art more clearly, the following outlines the drawings to be used in the embodiments of this application. Evidently, the drawings outlined below are merely about some embodiments of this application, and a person of ordinary skill in the art may derive other embodiments from the drawings.

DETAILED DESCRIPTION

To make the objectives, technical solutions and advantages of this application clearer, the following describes this application in further detail with reference to drawings and embodiments. It is apparent that the described embodiments are merely a part of but not all of the embodiments of this application. All other embodiments derived based on the embodiments of this application fall within the protection scope of this application.

The electrochemical device is not particularly limited in this application, and may be any electrochemical device that can use this application, for example, a lithium-ion battery, a sodium-ion battery, a magnesium-ion battery, or a super capacitor. For ease of description, the following uses a lithium-ion battery as an example, but this does not mean that the electrochemical device of this application is limited to a lithium-ion battery.

A first aspect of this application provides an electrochemical device, including a first electrode assembly, a second electrode assembly, and a packaging shell. The first electrode assembly and the second electrode assembly are each located in a separate cavity in the packaging shell. Two opposite-polarity tabs of the first electrode assembly and the second electrode assembly are connected in the packaging shell. The connected two opposite-polarity tabs include a first tab extending out of the packaging shell.

In some embodiments of this application, the connected two opposite-polarity tabs further include a second tab not extending out of the packaging shell.

In this application, the tab not extending out of the packaging shell may be formed in two ways: one is to perform heat sealing when an end of the tab is lower than an edge of the integrated packaging shell; and the other is to seal two outer packages integrally when the end of the tab is higher than the edge of one of the two separate packaging shells but the portion by which the end of the tab is higher than the edge is wrapped by the other packaging shell.

Figure 1:
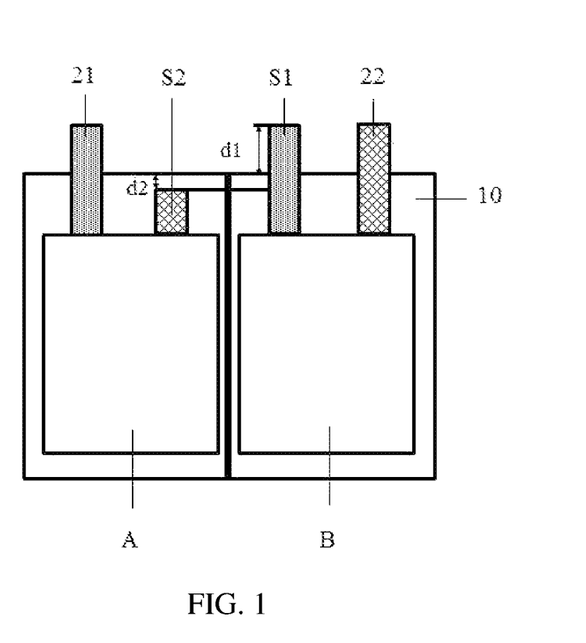
FIG. 1 is a schematic diagram of an electrochemical device according to an embodiment of this application.

FIG. 1 is a schematic diagram of an electrochemical device according to an embodiment of this application, where a first electrode assembly A and a second electrode assembly B are located in separate cavities in the packaging shell 10. The first electrode assembly A and second electrode assembly B that are adjacent to each other are connected to each other in a packaging shell 10 by opposite-polarity tabs S1 and S2. In the interconnected opposite-polarity tabs S1 and S2, the tab S1 extends out of the packaging shell 10, and the tab S2 does not extend out of the packaging shell. Tabs 21 and 22 are led out from the first electrode assembly A and the second electrode assembly B separately to serve as a positive terminal and a negative terminal respectively.

In some embodiments of this application, each separate cavity is a hermetic cavity, and contains an electrode assembly and an electrolytic solution. Ion insulation is implemented between the cavities to avoid an internal short circuit of the electrochemical device and electrolyte decomposition under a high voltage, thereby improving the charge and discharge performance and safety performance of the electrochemical device and ensuring effective electrical energy output of the electrochemical device. The adjacent electrode assemblies are connected to each other in the packaging shell by two tabs, and one of the two interconnected tabs extends out of the outer package. This design of extending the tab effectively increases the sealing strength and the sealing reliability, and can also implement voltage monitoring for a single electrochemical cell, thereby facilitating quick locating of a faulty electrochemical cell and identification of the failure cause, and improving the manufacturing yield rate and production efficiency of the electrochemical device.

In some embodiments of this application, 1 mm≤d1≤100 mm, wherein d1 is a length by which the first tab extends out of the packaging shell, and preferably 2 mm≤d1≤50 mm.

In some embodiments of this application, 0 mm≤d2≤30 mm, wherein d2 is a vertical distance between an end of the second tab and an outer edge of the packaging shell from which the first tab extends out of the packaging shell, and preferably, 0 mm≤d2≤10 mm.

In this application, d1 and d2 falling within the foregoing range can increase the sealing strength of the tab region.

In some embodiments of this application, 5 mm≤d1+d2≤20 mm. When satisfying the foregoing relationship, d1 and d2 can increase the sealing strength and the sealing reliability.

In some embodiments of this application, 2<x≤y−1, where x is a quantity of tabs extending out of the packaging shell and y is a total quantity of tabs. When satisfying the foregoing relationship, x and y of the electrochemical device can increase the sealing strength and the sealing reliability, and can also implement voltage monitoring for a single electrochemical cell in the electrochemical device, thereby facilitating quick locating of a faulty electrochemical cell and identification of the failure cause, and improving the yield rate of the electrochemical device.

The value of y is not limited in this application, and may be selected by a person skilled in the art according to actual needs, as long as the objectives of this application are achieved. For example, y≥4.

In some embodiments of this application, the cavity contains a partition plate. The partition plate includes an ion insulation layer and a sealing layer. With the partition plate, ion isolation is implemented between the electrode assemblies, and safety hazards such as an internal short circuit or electrolyte decomposition under a high voltage are avoided, thereby improving the safety performance of the electrochemical device and ensuring effective electrical energy output of the electrochemical device.

Figure 2:
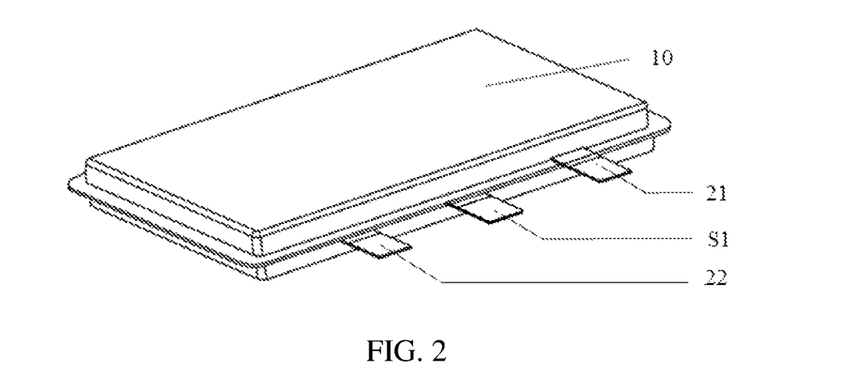
FIG. 2 is a schematic diagram of an electrochemical device according to another embodiment of this application.
Figure 3:
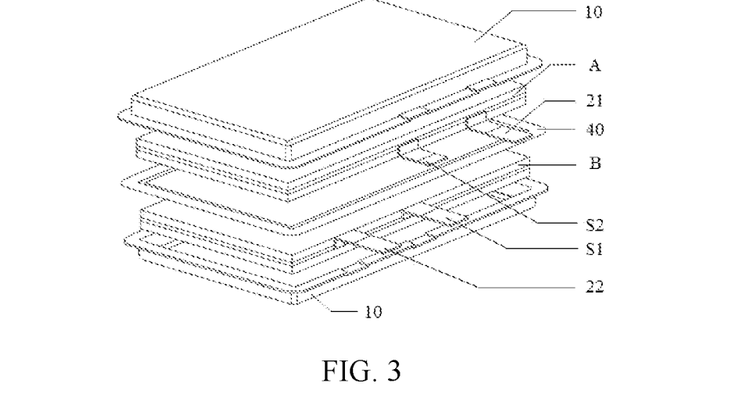
FIG. 3 is a schematic exploded view of the electrochemical device shown in FIG. 2.

FIG. 2 is a schematic structural diagram of an electrochemical device according to an embodiment of this application. FIG. 3 is schematic exploded view of the electrochemical device shown in FIG. 2. Referring to FIG. 2 and FIG. 3, the electrode assembly A is separated from the electrode assembly B by the partition plate 40. The partition plate 40 is hermetically connected to the packaging shell 10 to form separate hermetic cavities at both sides of the partition plate 40. The hermetic cavities are ionically insulated from each other. Each hermetic cavity contains an electrode assembly and an electrolytic solution. The electrode assembly A and the electrode assembly B that are adjacent to each other are connected in a sealed region of the packaging shell 10 by opposite-polarity tabs S1 and S2. One tab S1 of the two interconnected tabs extends out of the packaging shell 10 to monitor voltage of the electrochemical cell containing the electrode assembly B. Tabs 21 and 22 are led out from the electrode assembly A and the electrode assembly B separately to serve as a positive terminal and a negative terminal respectively. The terminals serve a purpose of connection during charging and discharging.

Figure 4:
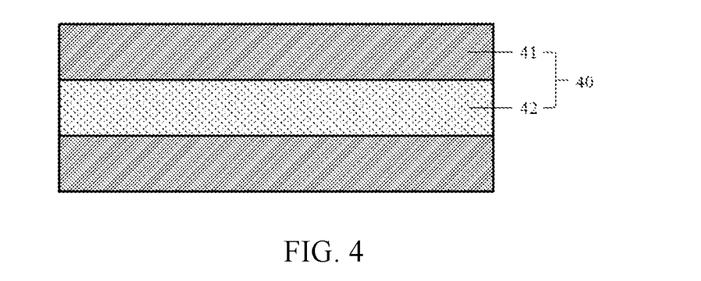
FIG. 4 is a cross-sectional schematic view of a partition plate of an electrochemical device according to an embodiment of this application.

FIG. 4 is a cross-sectional schematic view of a partition plate of an electrochemical device according to an embodiment of this application. The partition plate 40 includes an ion insulation layer 42 and a sealing layer 41. The sealing layer 41 is configured to hermetically connect the ion insulation layer 42 and the packaging shell.

In some embodiments of this application, the sealing layer is located at a peripheral edge of the ion insulation layer or on the entire surface of the ion insulation layer. When the sealing layer is located at the peripheral edge of the ion insulation layer, a coating width of the sealing layer is not particularly limited, as long as the objectives of this application can be achieved. For example, the coating amount and weight percent of the sealing material are reduced as far as possible, and the weight percent of inactive materials is reduced, so as to increase the energy density of the electrochemical device. When the sealing layer is located on the entire surface of the ion insulation layer, water permeability of the partition plate can be effectively reduced. When the electrochemical device works in an environment with high air humidity, short circuits of the electrochemical device caused by water absorbed in the partition plate can be avoided more effectively, thereby reducing probability of safety faults.

In some embodiments of this application, the sealing layer is located at the peripheral edge of the surface of the ion insulation layer. The ion insulation layer is a conductive material. A separator forms an outermost side of at least one of the electrode assemblies located at two sides of the partition plate, where the outermost side is adjacent to the partition plate.

In some embodiments of this application, the sealing layer is located at the peripheral edge of the surface of the ion insulation layer, and the ion insulation layer is made of an insulation material. One of a separator, a positive current collector, a negative current collector, a positive active material, or a negative active material may form the outermost side of the electrode assemblies at the two sides of the partition plate, where the outermost side is adjacent to the partition plate.

In some embodiments of this application, the sealing layer is located on the entire surface of the ion insulation layer, and one of the separator, the positive current collector, the negative current collector, the positive active material, or the negative active material may form the outermost side of the electrode assemblies at the two sides of the partition plate, where the outermost side is adjacent to the partition plate.

In this application, the structure of the ion insulation layer is not particularly limited as long as the objectives of this application can be achieved. For example, the ion insulation layer may be a single-layer structure or a multilayer composite structure.

In some embodiments of this application, the material of the ion insulation layer includes at least one of a polymer material, a metal material, or a carbon material.

The polymer material is not particularly limited as long as the objectives of this application can be achieved. The polymer material be any material well known to a person skilled in the art. For example, the polymer material may include at least one of: polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon, vinylon, polypropylene, acid anhydride modified polypropylene, polyethylene, ethylene-vinyl-acetate copolymer, ethylene-ethyl-acrylate copolymer, ethylene-acrylate copolymer, ethylene vinyl alcohol copolymer, polyvinyl chloride, polystyrene, polyether nitrile, polyurethane, polyphenylene ether, polyester, polysulfone, amorphous α-olefin copolymer, or a derivative thereof.

The metal material is not particularly limited, and may be any material well known to a person skilled in the art as long as the objectives of this application can be achieved. For example, the metal material may include at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel, or a combination thereof or an alloy thereof. Preferably, a metal material that is well resistant to redox under an environment of a lithium-ion battery may be selected.

The carbon material includes at least one of carbon felt, carbon film, carbon black, acetylene black, fullerene, conductive graphite film, or graphene film.

In some embodiments of this application, the ion insulation layer is preferably made of a polymer material. Because the density of the polymer material is low, the weight of inactive materials is reduced, and the gravimetric energy density of the electrode assemblies is increased. In addition, the ion insulation layer made of a polymer material is less likely to generate scraps in a case of mechanical abuse (such as nail penetration, impact, and extrusion), and is more effective in wrapping a mechanically broken surface, thereby improving a safety boundary in the case of mechanical abuse and increasing the safety test pass rate.

In some embodiments of this application, the ion insulation layer is preferably made of a metal material, and is highly reliable for isolation. The metal material is tougher and more compact than a polymer material, and can achieve a thinner processing thickness. When the ion insulation layer is preferably made of a carbon material film, the safety performance of the product is excellent, especially the thermal conductivity is high and the high-temperature reliability is very high.

In some embodiments of this application, as long as the objectives of this application can be achieved, the material of the sealing layer is not particularly limited and may be any material well known to a person skilled in the art, for example, may include at least one of polypropylene, acid anhydride modified polypropylene, polyethylene, ethylene-vinyl-acetate copolymer, ethylene-ethyl-acrylate copolymer, ethylene-acrylate copolymer, ethylene-vinyl-alcohol copolymer, polyvinyl chloride, polystyrene, polyether nitrile, polyurethane, polyamide, polyester, amorphous α-olefin copolymer, or a derivative thereof.

Certainly, when the sealing layer of this application overlays the entire surface of the ion insulation layer, the sealing layer also serves a function of ion insulation. In this application, for ease of description, the partition plate is divided into an ion insulation layer and a sealing layer, which does not mean that the sealing layer lacks ion insulativity. For example, when both sides of the ion insulation layer are fully overlaid with the sealing layer, the ion insulation layer and the sealing layer together serve the function of ion insulation.

In some embodiments of this application, a thickness of the partition plate is 2 μm to 100 μm, preferably 5 μm to 50 μm, and more preferably, 5 μm to 20 μm. When the thickness of the partition plate is less than 2 μm, the mechanical strength of the partition plate may be insufficient, and is likely to cause breakage and affect the performance or even safety of the electrochemical device. When the thickness is greater than 100 μm, the weight percent of the introduced inactive materials increases, thereby reducing the energy density of the electrochemical device.

In some embodiments of this application, when the sealing layer is just located in the sealed region, the thickness of the partition plate is solely the thickness of the ion insulation layer. When the sealing layer overlays the entire ion insulation layer, the thickness of the partition plate is a sum of the thickness of the ion insulation layer and the thicknesses of the sealing layers at two sides of the ion insulation layer. The thicknesses of the sealing layers at two sides of the ion insulation layer may be the same or different, as long as the objectives of this application can be achieved. For example, the thicknesses of the sealing layers at two sides of the ion insulation layer are the same.

In some embodiments of this application, the melting point of the material of the ion insulation layer is at least 165° C. When falling within the foregoing range, the melting point of the material of the ion insulation layer can better hot-melt together with the material of the sealing layer to implement sealing.

In some embodiments of this application, the melting point of the material of the sealing layer is 100° C. to 250° C., preferably, 110° C. to 180° C., and more preferably, 120° C. to 160° C. When falling within the foregoing temperature range, the melting point of the material of the sealing layer facilitates hermetic connection between the partition plate and the outer package. In this way, the electrochemical device obtained is highly reliable in sealing and in use, and the connection between adjacent electrode assemblies is highly reliable.

In this application, the hermetic connection between the partition plate and the packaging shell means hermetic connection between the sealing layer of the partition plate and an inner layer of the packaging shell. In this way, separate hermetic cavities are formed in the electrochemical device, and ionic insulation is implemented between a plurality of electrode assemblies of liquid-state serial-connected batteries, thereby avoiding safety hazards such as an internal short circuit or electrolyte decomposition under a high voltage and improving the safety performance of the electrochemical device.

In some embodiments of this application, the partition plate is a bipolar current collector. The bipolar current collector includes at least one of a metallic bipolar current collector or a composite bipolar current collector.

The metallic current collector includes at least one of stainless steel, nickel (Ni), titanium (Ti), gold (Au), copper (Cu), or platinum (Pt) bipolar current collector, and the composite bipolar current collector includes at least one of a copper-aluminum composite current collector or a polymer-metal composite current collector.

In this application, the type of the electrode assembly is not particularly limited. For example, the electrode assemblies may include at least one of a jelly-roll electrode assembly or a stacked electrode assembly.

In some embodiments of this application, the structure of the electrode assembly is a jelly-roll structure. At least one positive tab and one negative tab are led out from the positive electrode plate and the negative electrode plate of the electrode assembly respectively.

In some embodiments of this application, the structure of the electrode assembly is a stacked structure. The electrode assembly includes a plurality of tabs. One positive tab and one negative tab are led out from each layer of positive electrode plate and negative electrode plate respectively. The ultimate electrode assembly of a stacked structure includes a plurality of groups of positive tabs and negative tabs. The tabs are welded onto a metal sheet through transfer bonding, and then the positive tab and the negative tab are led out separately.

In some embodiments of this application, the structure of the electrode assembly is a parallel-connected structure of at least two jelly-roll structures. The at least two jelly-roll structures include a plurality of groups of positive tabs and negative tabs. The tabs are welded onto a metal sheet through transfer bonding, and then the positive tab and the negative tab are led out separately.

In some embodiments of this application, the structure of the electrode assembly is a parallel-connected structure of a jelly-roll structure and a stacked structure. The jelly-roll structure and a stacked structure include a plurality of positive tabs and negative tabs. The tabs are welded onto a metal sheet through transfer bonding, and then the positive tab and the negative tab are led out separately.

In this application, a "tab" generally means a metal conductor led out from a positive electrode plate or a negative electrode plate, and is configured to serial-connect or parallel-connect other parts of the electrochemical device. The positive tab is led out from the positive electrode plate, and the negative tab is led out from the negative electrode plate.

In some embodiments of this application, the material of the positive tab includes at least one of aluminum (Al) or aluminum alloy. The tab made of such a material possesses advantages such as superb molding and processing properties, high resistance to corrosion, and high weldability and conductivity. The material of the negative tab includes at least one of nickel (Ni), copper (Cu) or nickel-plated copper (Ni—Cu). The tab made of such a material is of high electrical and thermal conductivity, high ductility, high processing performance, high welding performance, and the like.

The welding manner of the tabs is not particularly limited in this application, as long as the objectives of this application can be achieved. For example, the welding manner may be at least one of laser welding, ultrasonic welding, resistance welding, or the like.

The lead-out direction of the tabs is not particularly limited in this application, as long as the objectives of this application can be achieved. For example, the lead-out directions of the tabs may be the same direction or different directions.

In some embodiments of this application, the electrochemical device further includes a plurality of third electrode assemblies.

In some embodiments of this application, the connection manner of the third electrode assembly includes at least one of: a serial or a parallel connection to the first electrode assembly, a serial or a parallel connection to the second electrode assembly, or a parallel connection to a serial connection portion that includes the first electrode assembly and the second electrode assembly.

In some embodiments of this application, the plurality of third electrode assemblies include at least 2 electrode assemblies that are serial-connected, parallel-connected, or serial-parallel-connected to form an electrode assembly group.

In some embodiments of this application, the connection manner of the electrode assembly group includes at least one of: a serial or a parallel connection to the first electrode assembly, a serial or a parallel connection to the second electrode assembly, or a parallel connection to a serial connection portion that includes the first electrode assembly and the second electrode assembly.

Figure 5:
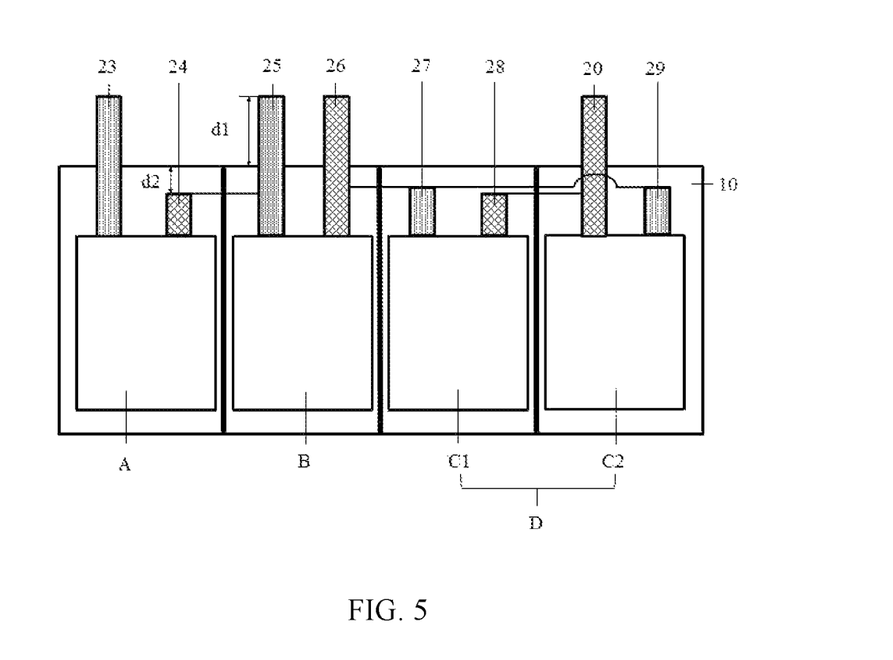
FIG. 5 is a schematic diagram of an electrochemical device according to still another embodiment of this application.

FIG. 5 shows an embodiment of this application, where the electrochemical device further includes 2 third electrode assemblies: C1 and C2. The third electrode assembly C1 and the third electrode assembly C2 are connected by positive tabs 27 and 29, and connected by negative tabs 28 and 20, so as to implement a parallel connection and form an electrode assembly group D. The negative tab 24 of the first electrode assembly A is connected to the positive tab 25 of the second electrode assembly B to form a serial connection. The positive tab 25 in the two interconnected tabs extends out of the packaging shell 10, and the negative tab 24 does not extend out of the packaging shell 10. The electrode assembly group D is located at one side of the first electrode assembly A and the second electrode assembly B that are serial-connected, and is adjacent to the second electrode assembly B. The negative tab 26 of the second electrode assembly B is connected to the positive tab 27 of the third electrode assembly C1 to form a serial connection. The negative tab 26 in the two interconnected tabs extends out of the packaging shell 10, and the positive tab 27 does not extend out of the packaging shell 10. The positive tab 23 of the first electrode assembly A and the negative tab 20 of the third electrode assembly C2 serve as a positive terminal and a negative terminal respectively and extend out of the packaging shell 10. Same-polarity tabs are parallel-connected to reduce an internal resistance of the electrochemical device and provide a higher current. Opposite-polarity tabs are serial-connected to increase the output voltage of the electrochemical device.

In some embodiments of this application, only one of the two serial-connected tabs extends out of the packaging shell, and the other tab is located inside the packaging shell. The design of such a tab connection structure effectively increases the sealing strength and the sealing reliability, and can also implement voltage monitoring for a single electrochemical cell, thereby facilitating quick locating of a faulty electrode assembly and identification of the failure cause.

In some embodiments of this application, $2 < x \leq n+3$, wherein x is a quantity of tabs extending out of the packaging shell and n is a number of electrode assemblies in the plurality of third electrode assemblies. When satisfying the foregoing relationship, x of the electrochemical device can effectively increase the sealing strength and the sealing reliability, and can also implement voltage monitoring for a single electrochemical cell in the electrochemical device, thereby facilitating quick locating of a faulty electrode assembly and identification of the failure cause, and improving the yield rate of the electrochemical device.

The packaging shell is not particularly limited in this application as long as the objectives of this application can be achieved. For example, the packaging shell may include at least one of an aluminum plastic film, an aluminum shell, a steel shell, or a plastic shell.

The thickness of the packaging shell is not particularly limited in this application, as long as the objectives of this application can be achieved. For example, the thickness of the packaging shell may be 60 μm to 500 μm, preferably 60 μm to 300 μm, and more preferably, 60 μm to 200 μm. The packaging shell with such a thickness can effectively protect the internal structure of the electrochemical device.

In some embodiments of this application, the electrode assembly may include a separator, a positive electrode plate, and a negative electrode plate. The separator is configured to separate the positive electrode plate from the negative electrode plate, prevent an internal short circuit of the electrochemical device, and allow electrolyte ions to pass freely to implement electrochemical charging and discharging processes. The quantities of the separators, positive electrode plates, and negative electrode plates are not particularly limited in this application, as long as the objectives of this application can be achieved.

In some embodiments of this application, the separator is not particularly limited, and may be any separator well known in the art, as long as the objectives of this application can be achieved. For example, the separator may be at least one of: a polyethylene (PE)- and polypropylene (PP)-based polyolefin (PO) separator, a polyester film (such as polyethylene terephthalate (PET) film), a cellulose film, a polyimide film (PI), a polyamide film (PA), a spandex or aramid film, a woven film, a non-woven film (non-woven fabric), a microporous film, a composite film, separator paper, a laminated film, or a spinning film.

For example, the separator may include a substrate layer and a surface treatment layer. The substrate layer may be a non-woven fabric, film or composite film, which, in each case, is porous. The material of the substrate layer may include at least one of polyethylene, polypropylene, polyethylene terephthalate, polyimide, or the like. Optionally, the substrate layer may be a polypropylene porous film, a polyethylene porous film, a polypropylene non-woven fabric, a polyethylene non-woven fabric, or a polypropylene-polyethylene-polypropylene porous composite film. Optionally, a surface treatment layer is disposed on at least one surface of the substrate layer. The surface treatment layer may be a polymer layer or an inorganic compound layer, or a layer formed by mixing a polymer and an inorganic compound.

For example, the inorganic compound layer includes inorganic particles and a binder. The inorganic particles are not particularly limited, and may be at least one selected from: aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, barium sulfate, or the like. The binder is not particularly limited, and may be one or more selected from polyvinylidene fluoride, vinylidene fluoride-hexafluoropropylene copolymer, polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, or polyhexafluoropropylene. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride, poly(vinylidene fluoride-hexafluoropropylene), or the like.

In some embodiments of this application, the positive electrode plate is not particularly limited, as long as the objectives of this application can be achieved. For example, the positive electrode plate generally includes a positive current collector and a positive active material. The positive current collector is not particularly limited in this application, and may be any positive current collector well known in the art. For example, the positive current collector may be a copper foil, an aluminum foil, an aluminum alloy foil, a composite current collector, or the like. The positive active material is not particularly limited, and may be any positive active material in the prior art. The positive active material includes at least one of lithium nickel cobalt manganese oxide, lithium nickel cobalt aluminum oxide, lithium iron phosphate, lithium cobaltate, lithium manganate, lithium manganese iron phosphate, or the like. The thicknesses of the positive current collector and the positive active material are not particularly limited in this application, as long as the objectives of this application can be achieved. For example, the thickness of the positive current collector is 8 µm to 12 µm, and the thickness of the positive active material is 30 µm to 120 µm.

Optionally, the positive electrode plate may further include a conductive layer. The conductive layer is located between the positive current collector and the positive active material layer. The composition of the conductive layer is not particularly limited, and may be a conductive layer commonly used in the art. The conductive layer includes a conductive agent and a binder.

In some embodiments of this application, the negative electrode plate is not particularly limited, as long as the objectives of this application can be achieved. For example, the negative electrode plate generally includes a negative current collector and a negative active material. The negative current collector is not particularly limited in this application, and may be any negative current collector well known in the art. For example, the negative current collector may be a copper foil, an aluminum foil, an aluminum alloy foil, a composite current collector, or the like. The negative active material is not particularly limited, and may be any negative active material well known in the art. For example, the negative active material may include at least one of artificial graphite, natural graphite, mesocarbon microbead, silicon, silicon carbon, silicon-oxygen compound, soft carbon, hard carbon, lithium titanate, niobium titanate, or the like. The thicknesses of the negative current collector and the negative active material are not particularly limited in this application, as long as the objectives of this application can be achieved. For example, the thickness of the negative current collector is 6 µm to 10 µm, and the thickness of the negative active material is 30 µm to 120 µm.

Optionally, the negative electrode plate may further include a conductive layer. The conductive layer is located between the negative current collector and the negative active material layer. The composition of the conductive layer is not particularly limited, and may be a conductive layer commonly used in the art. The conductive layer includes a conductive agent and a binder.

The conductive agent is not particularly limited, and may be any conductive agent well known in the art, as long as the objectives of this application can be achieved. For example, the conductive agent may include at least one of conductive carbon black (Super P), carbon nanotubes (CNTs), carbon fiber, graphene, or the like. The binder is not particularly limited, and may be any binder well known in the art, as long as the objectives of this application can be achieved. For example, the binder may include at least one of styrene-butadiene rubber (SBR), polyvinyl alcohol (PVA), polytetrafluoroethylene (PTFE), sodium carboxymethyl cellulose (CMC-Na), or the like. For example, the binder may be styrene butadiene rubber (SBR).

In this application, the electrolytic solution is not particularly limited, and may be any electrolytic solution well known to a person skilled in the art. For example, the status of the electrolytic solution is any one selected from a gel state, a solid state, or a liquid state. For example, the liquid-state electrolytic solution includes a lithium salt and a nonaqueous solvent.

The lithium salt is not particularly limited, and may be any lithium salt well known in the art, as long as the objectives of this application can be achieved. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiPO_2F_2$, or the like. For example, the lithium salt may be $LiPF_6$.

The nonaqueous solvent is not particularly limited, as long as the objectives of this application can be achieved. For example, the nonaqueous solvent may include at least one of carbonate compound, a carboxylate compound, an ether compound, a nitrile compound, another organic solvent, or the like.

For example, the carbonate compound may include at least one of diethyl carbonate (DEC), dimethyl carbonate (DMC), dipropyl carbonate (DPC), methyl propyl carbonate (MPC), ethylene propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or the like.

The hermetic connection manner between the partition plate and the packaging shell is not particularly limited in this application, as long as the objectives of this application can achieved. For example, the sealing manner includes one of hot pressing, adhesive sealing, and welding. The hot pressing conditions are not particularly limited in this application, as long as the objectives of this application can be achieved. For example, for a polypropylene inner-layer material, the hot pressing temperature is 150° C. to 220° C., and the hot pressing pressure is 0.1 MPa to 0.6 MPa.

A second aspect of this application provides an electronic device. The electronic device includes the electrochemical device according to the first aspect of this application.

The electronic device according to this application includes a general-purpose electronic device in the art, for example, a notebook computer, a pen-input computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The terms used in this application are generally terms commonly used by a person skilled in the art. If a term used herein is inconsistent with the commonly used terms, the term used in this application prevails.

Test Methods:
Energy Density of Discharging at 0.1 C:

Leaving the electrochemical device to stand at a normal temperature for 30 minutes, charging the electrochemical device at a constant-current rate of 0.05 C until a voltage of 4.4×N V (N is the quantity of serial-connected electrode assemblies), and then discharging the electrochemical device at a 0.05 C rate until a voltage of 3.0×N V. Repeating the foregoing charging/discharging steps for 3 cycles to complete chemical formation of the electrochemical device under test. Charging the electrochemical device at a constant-current rate of 0.1 C until a voltage of 4.4×N V after completion of the chemical formation, and then discharging the electrochemical device at a rate of 0.1 C until a voltage of 3.0×N V. Recording the discharge capacity, and then calculating the energy density of discharging at 0.1 C.

Energy density (Wh/L)=discharge capacity (Wh)/
volume of the electrochemical device (L)

Sealing Strength of a Tab Region:

Selecting a flat portion of the sealed structure of the partition plate board and the packaging shell, and cutting the selected portion into a sample 8 mm wide. Clamping the partition plate at one end of the sample with a tension meter, and clamping the other end with another gripper of the tension meter. Pulling the sample toward two opposite sides at a stretching speed of 20 mm/min until the partition plate is fully separated from the sealing tape. Recording a peak value of the tensile force in the pulling process, and using the peak value as the sealing strength.

Manufacturing Yield Rate:

> Manufacturing yield rate (%)=quantity of qualified lithium-ion batteries manufactured (PCS)/total quantity of lithium-ion batteries manufactured (PCS).

Failure of a Serial Connection Portion Caused by Bending:

Performing a bending test on the tabs serial-connected between the electrode assemblies, checking whether the electrochemical device is open-circuited, and determining a failure if an open circuit occurs.

The implementations of this application are described below in more detail with reference to embodiments and comparative embodiments. Various tests and evaluations are performed in accordance with the following methods. In addition, unless otherwise expressly specified, "fraction" and "%" are a measure of mass.

Embodiment 1

Preparing a Negative Electrode Plate

Mixing graphite as a negative active material, conductive carbon black (Super P), and styrene butadiene rubber (SBR) at a mass ratio of 96:1.5:2.5, then adding deionized water as a solvent, blending the mixture into a slurry with a solid content of 70%, and stirring the slurry evenly. Coating one surface of an 8 μm-thick copper foil as a negative current collector with the slurry evenly, and drying the slurry at a temperature of 110° C. to obtain a negative electrode plate of which a single side is coated with a 130 μm-thick negative active material. A single side of the negative electrode plate has been coated upon completion of the foregoing steps. Then repeating the foregoing steps on the other surface of the negative electrode plate to obtain a negative electrode plate of which both sides are coated with the negative active material. After completion of the coating, cutting the electrode plate into a size of 41 mm×61 mm for future use.

Preparing a Positive Electrode Plate

Mixing lithium cobalt oxide ($LiCoO_2$) as a positive active material, conductive carbon black (super P), and polyvinylidene difluoride (PVDF) at a mass ratio of 97.5:1.0:1.5, adding N-methylpyrrolidone NMP as a solvent, blending the mixture into a slurry with a solid content of 75%, and stirring the slurry evenly. Coating one surface of a 10 μm-thick aluminum foil as a positive current collector with the slurry evenly, and drying the slurry at a temperature of 90° C. to obtain a positive electrode plate coated with a 110 μm-thick coating layer. A single side of the positive electrode plate has been coated upon completion of the foregoing steps. Then repeating the foregoing steps on the other surface of the positive electrode plate to obtain a positive electrode plate of which both sides are coated with the positive active material. After completion of the coating, cutting the electrode plate into a size of 38 mm×58 mm for future use.

Preparing an Electrolytic Solution

Mixing ethylene carbonate (EC), ethyl methyl carbonate (EMC), and diethyl carbonate (DEC) at a mass ratio of EC:EMC:DEC=30:50:20 in a dry argon atmosphere to form an organic solvent, then adding lithium salt hexafluorophosphate ($LiPF_6$) into the organic solvent to dissolve, and mixing the solution evenly to obtain an electrolytic solution in which a lithium salt concentration is 1.15 mol/L.

Preparing an Electrode Assembly

Placing a 15 μm-thick PP separator between the positive electrode plate and the negative electrode plate that are prepared above, stacking the plates, and then fixing four corners of the stacked plates to form a stacked electrode assembly. The quantity of layers of the positive electrode plates is 13, and the quantity of layers of the negative electrode plates is 14.

Preparing a Partition Plate

Dispersing a sealing layer material PP into a dispersant N-methylpyrrolidone (NMP) evenly to obtain a sealing layer suspension; applying the sealing layer material PP onto two sides of an ion insulation layer (a 10 μm-thick polyimide (PI) film) by using an applicator; and drying the dispersant NMP in the sealing layer suspension at 130° C. to complete preparing the partition plate. The total thickness of the partition plate is 15 μm, the melting point of the ion insulation layer PI is 334° C., and the melting point of the sealing layer PP is 150° C.

Preparing a Lithium-Ion Battery

Placing a piece of punch-molded packaging shell (a 150 μm-thick aluminum plastic film) into an assembly jig, with a pit side facing upward, and then placing one electrode assembly (hereinafter referred to as electrode assembly A) into a pit of the packaging shell. Leading out one Al positive tab and one Ni negative tab from the electrode assembly A.

Then placing the partition plate onto the electrode assembly A so that the partition plate contacts the electrode assembly A, and pressing tightly by exerting an external force.

Placing an electrode assembly (hereinafter referred to as electrode assembly B) onto the partition plate so that the electrode assembly B contacts the partition plate, and pressing tightly by exerting an external force. Leading out one Al positive tab and one Ni negative tab from the electrode assembly B.

Welding the negative tab of the electrode assembly A and the positive tab of the electrode assembly B together through laser welding to serial-connect the two tabs.

Then extending the positive tab and the negative tab of the electrode assembly A as well as the negative tab of the electrode assembly B out of the packaging shell, leaving 8 mm outside the packaging shell as a length d1 by which the foregoing tabs extend outside the packaging shell, and retaining the positive tab of the electrode assembly B inside the packaging shell, where a vertical distance d2 between the end of the tab and the outer edge of the packaging shell is 10 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form two separate cavities at two sides of the partition plate. The heat sealing temperature is 180° C., and the heat sealing pressure is 0.5 MPa.

Injecting the electrolytic solution into the two cavities containing the electrode assemblies separately, and sealing the port after the injection.

In the charging and discharging process, it is just necessary to connect the positive tab of the electrode assembly A and the negative tab of the electrode assembly B.

Embodiment 2

This embodiment is the same as Embodiment 1 except that the thickness of the partition plate is 2 μm as shown in Table 1A and Table 1B.

Embodiment 3

This embodiment is the same as Embodiment 1 except that the thickness of the partition plate is 5 μm as shown in Table 1A and Table 1B.

Embodiment 4

This embodiment is the same as Embodiment 1 except that the thickness of the partition plate is 20 μm as shown in Table 1A and Table 1B.

Embodiment 5

This embodiment is the same as Embodiment 1 except that the thickness of the partition plate is 50 μm as shown in Table 1A and Table 1B.

Embodiment 6

This embodiment is the same as Embodiment 1 except that the thickness of the partition plate is 100 μm as shown in Table 1A and Table 1B.

Embodiment 7

This embodiment is the same as Embodiment 1 except that the sealing layer material of the partition plate is polystyrene and the melting point of the material is 240° C. as shown in Table 1A and Table 1B.

Embodiment 8

This embodiment is the same as Embodiment 1 except that the sealing layer material of the partition plate is PE and the melting point of the material is 120° C. as shown in Table 1A and Table 1B.

Embodiment 9

This embodiment is the same as Embodiment 1 except that the ion insulation layer material of the partition plate is Al and the melting point of the material is 660° C. as shown in Table 1A and Table 1B.

Embodiment 10

This embodiment is the same as Embodiment 1 except that the ion insulation layer material of the partition plate is a carbon layer and the melting point of the material is 3500° C. as shown in Table 1A and Table 1B.

Embodiment 11

This embodiment is the same as Embodiment 1 except that the ion insulation layer material of the partition plate is stainless steel and the melting point of the material is 1440° C. as shown in Table 1A and Table 1B.

Embodiment 12

This embodiment is the same as Embodiment 1 except that the ion insulation layer material of the partition plate is a PP and the melting point of the material is 165° C. as shown in Table 1A and Table 1B.

Embodiment 13

This embodiment is the same as Embodiment 1 except that the ion insulation layer material of the partition plate is Cu—Al composite current collector and the melting point of the material is 550° C. as shown in Table 1A and Table 1B.

Embodiment 14

"Preparing a negative electrode plate", "preparing a positive electrode plate", "preparing an electrolytic solution", and "preparing an electrode assembly" are the same as those described in Embodiment 1.

Preparing a Partition Plate

Spraying a PET material on a stainless steel substrate to obtain a PET layer, heating the PET layer to soften it, and then implanting a conductive material Cu. Spraying the PET material again to form a PET film, hot-calendering the obtained PET film, removing the PET film from the surface of the stainless steel substrate with a scraper, and rewinding to obtain a 10 μm-thick polymer-metal composite current collector compounded of PET and Cu.

Dispersing a sealing layer material PP into a dispersant N-methylpyrrolidone (NMP) evenly to obtain a sealing layer suspension; applying the sealing layer material PP onto two sides of the prepared polymer-metal composite current collector by using an applicator; and drying the dispersant NMP in the sealing layer suspension at 130° C. to complete preparing the partition plate. The total thickness of the partition plate is 15 μm, the melting point of the polymer-metal composite current collector is 260° C., and the melting point of the sealing layer PP is 150° C.

Preparing a Lithium-Ion Battery

This embodiment is the same as Embodiment 1 except that the partition plate prepared above is selected for use as shown in Table 1A and Table 1B.

Embodiment 15

This embodiment is the same as Embodiment 1 except that the material of the positive tab is aluminum alloy as shown in Table 1A and Table 1B.

Embodiment 16

This embodiment is the same as Embodiment 1 except that the material of the negative tab is Ni—Cu as shown in Table 1A and Table 1B.

Embodiment 17

This embodiment is the same as Embodiment 1 except that the thickness of the aluminum plastic film is 60 μm as shown in Table 1A and Table 1B.

Embodiment 18

This embodiment is the same as Embodiment 1 except that the thickness of the aluminum plastic film is 500 μm as shown in Table 1A and Table 1B.

Embodiment 19

This embodiment is the same as Embodiment 1 except that the process of preparing the lithium-ion battery is different from that in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A.

Then placing the partition plate (hereinafter referred to as partition plate a) onto the electrode assembly A so that the partition plate contacts the electrode assembly A, and pressing tightly by exerting an external force.

Placing an electrode assembly (hereinafter referred to as electrode assembly C1) onto the partition plate a so that the electrode assembly contacts the partition plate a, and pressing tightly by exerting an external force. Leading out one Al positive tab and one Ni negative tab from the electrode assembly C1.

Then placing a partition plate (hereinafter referred to as partition plate b) onto the electrode assembly C1 so that the partition plate contacts the electrode assembly C1, and pressing tightly by exerting an external force.

Placing an electrode assembly (hereinafter referred to as electrode assembly C2) onto the partition plate b so that the electrode assembly contacts the partition plate b, and pressing tightly by exerting an external force. Leading out one Al positive tab and one Ni negative tab from the electrode assembly C2.

Then placing a partition plate (hereinafter referred to as partition plate c) onto the electrode assembly C2 so that the partition plate contacts the electrode assembly C2, and pressing tightly by exerting an external force.

Placing an electrode assembly (hereinafter referred to as electrode assembly B) onto the partition plate c so that the electrode assembly contacts the partition plate c, and pressing tightly by exerting an external force. Leading out one Al positive tab and one Ni negative tab from the electrode assembly B.

Welding the negative tab of the electrode assembly A and the positive tab of the electrode assembly C1 together through laser welding to serial-connect the two tabs; welding the negative tab of the electrode assembly C1 and the positive tab of the electrode assembly C2 together through laser welding to serial-connect the two tabs; and welding the negative tab of the electrode assembly C2 and the positive tab of the electrode assembly B together through laser welding to serial-connect the two tabs.

Then extending the positive tab and the negative tab of the electrode assembly A, the negative tab of the electrode assembly C1, the negative tab of the electrode assembly C2, and the negative tab of the electrode assembly B out of the packaging shell, leaving 8 mm outside the packaging shell as a length d1 by which such tabs extend outside the packaging shell, and retaining the positive tab of the electrode assembly C1, the positive tab of the electrode assembly C2, and the positive tab of the electrode assembly B inside the packaging shell, where a vertical distance d2 between the end of the tabs and the outer edge of the packaging shell is 10 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form four separate cavities at two sides of the partition plate. The heat sealing temperature is 180° C., and the heat sealing pressure is 0.5 MPa.

Injecting the electrolytic solution into the four cavities containing the electrode assemblies separately, and sealing the port after the injection.

In the charging and discharging process, it is just necessary to connect the positive tab of the electrode assembly A and the negative tab of the electrode assembly B.

Embodiment 20

This embodiment is the same as Embodiment 1 except that the process of preparing the lithium-ion battery is different from that in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A.

Then placing the partition plate (hereinafter referred to as partition plate a) onto the electrode assembly A so that the partition plate contacts the electrode assembly A, and pressing tightly by exerting an external force.

Placing an electrode assembly (hereinafter referred to as electrode assembly C1) onto the partition plate a so that the electrode assembly contacts the partition plate a, and pressing tightly by exerting an external force. Leading out one Al positive tab and one Ni negative tab from the electrode assembly C1.

Then placing a partition plate (hereinafter referred to as partition plate b) onto the electrode assembly C1 so that the partition plate contacts the electrode assembly C1, and pressing tightly by exerting an external force.

Placing an electrode assembly (hereinafter referred to as electrode assembly C2) onto the partition plate b so that the electrode assembly contacts the partition plate b, and pressing tightly by exerting an external force. Leading out one Al positive tab and one Ni negative tab from the electrode assembly C2.

Then placing a partition plate (hereinafter referred to as partition plate c) onto the electrode assembly C2 so that the partition plate contacts the electrode assembly C2, and pressing tightly by exerting an external force.

Placing an electrode assembly (hereinafter referred to as electrode assembly B) onto the partition plate c so that the electrode assembly contacts the partition plate c, and pressing tightly by exerting an external force. Leading out one Al positive tab and one Ni negative tab from the electrode assembly B.

Welding the negative tab of the electrode assembly A and the positive tab of the electrode assembly C1 together through laser welding to serial-connect the two tabs; welding the negative tab of the electrode assembly C1 and the positive tab of the electrode assembly C2 together through laser welding to serial-connect the two tabs; and welding the negative tab of the electrode assembly C2 and the positive tab of the electrode assembly B together through laser welding to serial-connect the two tabs.

Then extending the positive tab and the negative tab of the electrode assembly A, the negative tab of the electrode assembly C1, the negative tab of the electrode assembly C2, and the positive tab and the negative tab of the electrode assembly B out of the packaging shell, leaving 8 mm outside the packaging shell as a length d1 by which such tabs extend outside the packaging shell, and retaining the positive tab of the electrode assembly C1 and the positive tab of the electrode assembly C2 inside the packaging shell, where a vertical distance d2 between the end of the tabs and the outer edge of the packaging shell is 10 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form four separate cavities at two sides of the partition plate. The heat sealing temperature is 180° C., and the heat sealing pressure is 0.5 MPa.

Injecting the electrolytic solution into the four cavities containing the electrode assemblies separately, and sealing the port after the injection.

In the charging and discharging process, it is just necessary to connect the positive tab of the electrode assembly A and the negative tab of the electrode assembly B.

Embodiment 21

This embodiment is the same as Embodiment 1 except that the length d1 by which the extending tabs extend outside the packaging shell is 100 mm as shown in Table 1A and Table 1B.

Embodiment 22

This embodiment is the same as Embodiment 1 except that the length d1 by which the extending tabs extend outside the packaging shell is 50 mm as shown in Table 1A and Table 1B.

Embodiment 23

This embodiment is the same as Embodiment 1 except that the length d1 by which the extending tabs extend outside the packaging shell is 2 mm as shown in Table 1A and Table 1B.

Embodiment 24

This embodiment is the same as Embodiment 1 except that the length d1 by which the extending tabs extend outside the packaging shell is 1 mm as shown in Table 1A and Table 1B.

Embodiment 25

This embodiment is the same as Embodiment 1 except that the vertical distance d2 between the end of the non-extending tabs and the outer edge of the packaging shell is 30 mm as shown in Table 1A and Table 1B.

Embodiment 26

This embodiment is the same as Embodiment 1 except that the vertical distance d2 between the end of the non-extending tabs and the outer edge of the packaging shell is 20 mm as shown in Table 1A and Table 1B.

Embodiment 27

This embodiment is the same as Embodiment 1 except that the vertical distance d2 between the end of the non-extending tabs and the outer edge of the packaging shell is 5 mm as shown in Table 1A and Table 1B.

Embodiment 28

This embodiment is the same as Embodiment 1 except that the process of preparing the lithium-ion battery is different from that in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A, where the lead-out direction of the positive tab is opposite to that of the negative tab.

Then placing the partition plate onto the electrode assembly A so that the partition plate contacts the electrode assembly A, and pressing tightly by exerting an external force.

Placing an electrode assembly (hereinafter referred to as electrode assembly B) onto the partition plate so that the electrode assembly B contacts the partition plate, and pressing tightly by exerting an external force. Leading out one Al positive tab and one Ni negative tab from the electrode assembly B, where the lead-out direction of the positive tab is opposite to that of the negative tab, the lead-out direction of the positive tab is the same as that of the negative tab of the electrode assembly A, and the lead-out direction of the negative tab is the same as that of the positive tab of the electrode assembly A.

Welding the negative tab of the electrode assembly A and the positive tab of the electrode assembly B together through laser welding to serial-connect the two tabs.

Then extending the positive tab and the negative tab of the electrode assembly A as well as the negative tab of the electrode assembly B out of the outer package, leaving 8 mm outside the packaging shell as a length d1 by which the foregoing tabs extend outside the packaging shell, and retaining the positive tab of the electrode assembly B inside the packaging shell, where a vertical distance d2 between the end of the tab and the outer edge of the packaging shell is 10 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form two separate cavities at two sides of the partition plate. The heat sealing temperature is 180° C., and the heat sealing pressure is 0.5 MPa.

Injecting the electrolytic solution into the two cavities containing the electrode assemblies separately, and sealing the port after the injection.

In the charging and discharging process, it is just necessary to connect the positive tab of the electrode assembly A and the negative tab of the electrode assembly B.

Embodiment 29

Preparing a Negative Electrode Plate

This embodiment is the same as Embodiment 1 except that the negative electrode plate is cut into a size of 465 mm×92 mm for future use.

Preparing a Positive Electrode Plate

This embodiment is the same as Embodiment 1 except that the positive electrode plate is cut into a size of 480 mm×90 mm for future use.

Preparing an Electrolytic Solution

Identical to Embodiment 1.

Preparing an Electrode Assembly

Stacking the prepared positive electrode plate, the 15 μm-thick PP separator, and the prepared negative electrode plate sequentially so that the separator is located between the positive electrode plate and the negative electrode plate to serve a function of separation, and winding the stacked plates to obtain a jelly-roll electrode assembly.

Preparing a Partition Plate

Identical to Embodiment 1.

Preparing a Lithium-Ion Battery

This embodiment is the same as Embodiment 1 except that the electrode assembly is the jelly-roll electrode assembly.

Embodiment 30

This embodiment is the same as Embodiment 1 except that the length d1 by which the extending tabs extend outside the packaging shell is 10 mm, and the vertical distance d2 between the end of the non-extending tabs and the outer edge of the packaging shell is 8 mm, as shown in Table 1A and Table 1B.

Embodiment 31

This embodiment is the same as Embodiment 1 except that the length d1 by which the extending tabs extend outside the packaging shell is 2 mm, and the vertical distance d2 between the end of the non-extending tabs and the outer edge of the packaging shell is 3 mm, as shown in Table 1A and Table 1B.

Embodiment 32

This embodiment is the same as Embodiment 1 except that the length d1 by which the extending tabs extend outside the packaging shell is 14 mm, and the vertical distance d2 between the end of the non-extending tabs and the outer edge of the packaging shell is 6 mm, as shown in Table 1A and Table 1B.

Data and test results of Embodiments 1~32 are shown in Table 1A and Table 1B.

Comparative Embodiment 1

"Preparing a negative electrode plate", "preparing a positive electrode plate", "preparing an electrolytic solution", and "preparing an electrode assembly" are the same as those described in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A.

Placing an electrode assembly (hereinafter referred to as electrode assembly B) onto the electrode assembly A to contact the electrode assembly A, and pressing tightly by exerting an external force. Leading out one Al positive tab and one Ni negative tab from the electrode assembly B.

Welding the negative tab of the electrode assembly A and the positive tab of the electrode assembly B together through laser welding to serial-connect the two tabs.

Then extending the positive tab and the negative tab of the electrode assembly A as well as the positive tab and the negative tab of the electrode assembly B out of the outer package, and distributing the tabs in a staggered manner, where a vertical distance d1 between the end of the tabs and the outer edge of the packaging shell is 8 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes. The heat sealing temperature is 180° C., and the heat sealing pressure is 0.5 MPa.

Injecting the electrolytic solution into the assembled electrode assembly, and sealing the port after the injection.

In the charging and discharging process, it is just necessary to connect the positive tab of the electrode assembly A and the negative tab of the electrode assembly B.

Comparative Embodiment 2

"Preparing a negative electrode plate", "preparing a positive electrode plate", "preparing an electrolytic solution", "preparing an electrode assembly", and "preparing a partition plate" are the same as those described in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A.

Then placing the partition plate onto the electrode assembly A so that the partition plate contacts the electrode assembly A, and pressing tightly by exerting an external force.

Placing an electrode assembly (hereinafter referred to as electrode assembly B) onto the partition plate so that the electrode assembly B contacts the partition plate, and pressing tightly by exerting an external force. Leading out one Al positive tab and one Ni negative tab from the electrode assembly B.

Welding the negative tab of the electrode assembly A and the positive tab of the electrode assembly B together through laser welding to serial-connect the two tabs.

Then extending the positive tab of the electrode assembly A and the negative tab of the electrode assembly B out of the packaging shell, where a vertical distance d1 between the end of the tabs and the outer edge of the packaging shell is 8 mm; retaining the negative tab of the electrode assembly A and the positive tab of the electrode assembly B inside the packaging shell, where a vertical distance d2 between the end of the tabs and the outer edge of the packaging shell is 10 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form two separate cavities at two sides of the partition plate. The heat sealing temperature is 180° C., and the heat sealing pressure is 0.5 MPa.

Injecting the electrolytic solution into the two cavities containing the electrode assemblies separately, and sealing the port after the injection.

In the charging and discharging process, it is just necessary to connect the positive tab of the electrode assembly A and the negative tab of the electrode assembly B.

Comparative Embodiment 3

"Preparing a negative electrode plate", "preparing a positive electrode plate", "preparing an electrolytic solution", "preparing an electrode assembly", and "preparing a partition plate" are the same as those described in Embodiment 1.

Preparing a Lithium-Ion Battery

Placing a piece of punch-molded packaging shell (a 150 μm-thick aluminum plastic film) into an assembly jig, with the pit side facing upward, and then placing one electrode assembly (hereinafter referred to as electrode assembly A) into a pit of the packaging shell. Leading out one Al positive tab and one Ni negative tab from the electrode assembly A.

Then placing the partition plate onto the electrode assembly A so that the partition plate contacts the electrode assembly A, and pressing tightly by exerting an external force.

Placing an electrode assembly (hereinafter referred to as electrode assembly B) onto the partition plate so that the electrode assembly B contacts the partition plate, and pressing tightly by exerting an external force. Leading out one Al positive tab and one Ni negative tab from the electrode assembly B.

Welding the negative tab of the electrode assembly A and the positive tab of the electrode assembly B together through laser welding to serial-connect the two tabs.

Then extending the positive tab and the negative tab of the electrode assembly A as well as the positive tab and the negative tab of the electrode assembly B together out of the packaging shell, where a vertical distance $d1$ between the end of the tabs and the outer edge of the packaging shell is 8 mm.

Then superimposing another piece of packaging shell (a 150 μm-thick aluminum plastic film) on the electrode assembly B, with the pit side facing downward, and heat-sealing the packaging shell except that the side of the electrolyte injection port is left unsealed, so as to obtain assembled electrodes and form two separate cavities at two sides of the partition plate. The heat sealing temperature is 180° C., and the heat sealing pressure is 0.5 MPa.

Injecting the electrolytic solution into the two cavities containing the electrode assemblies separately, and sealing the port after the injection.

In the charging and discharging process, it is just necessary to connect the positive tab of the electrode assembly A and the negative tab of the electrode assembly B.

Data and test results of Comparative Embodiments 1~3 are shown in Table 1A and Table 1B.

TABLE 1A

Preparation parameters and test results of embodiments and comparative embodiments

| | Thickness of partition plate (μm) | Material of sealing layer of partition plate | Melting point of material of sealing layer of partition plate (° C.) | Material of ion insulation layer of partition plate | Melting point of material of ion insulation layer of partition plate (° C.) | Material of positive tab | Material of negative tab | Thickness of aluminum plastic film (μm) |
|---|---|---|---|---|---|---|---|---|
| Embodiment 1 | 15 | PP | 150 | PI | 334 | Al | Ni | 150 |
| Embodiment 2 | 2 | PP | 150 | PI | 334 | Al | Ni | 150 |
| Embodiment 3 | 5 | PP | 150 | PI | 334 | Al | Ni | 150 |
| Embodiment 4 | 20 | PP | 150 | PI | 334 | Al | Ni | 150 |
| Embodiment 5 | 50 | PP | 150 | PI | 334 | Al | Ni | 150 |
| Embodiment 6 | 100 | PP | 150 | PI | 334 | Al | Ni | 150 |
| Embodiment 7 | 15 | Polystyrene | 240 | PI | 334 | Al | Ni | 150 |
| Embodiment 8 | 15 | PE | 120 | PI | 334 | Al | Ni | 150 |
| Embodiment 9 | 15 | PP | 150 | Al | 660 | Al | Ni | 150 |
| Embodiment 10 | 15 | PP | 150 | Carbon layer | 3500 | Al | Ni | 150 |
| Embodiment 11 | 15 | PP | 150 | Stainless steel | 1440 | Al | Ni | 150 |
| Embodiment 12 | 15 | PP | 150 | PP | 165 | Al | Ni | 150 |
| Embodiment 13 | 15 | PP | 150 | Cu—Al composite current collector | 550 | Al | Ni | 150 |
| Embodiment 14 | 15 | PP | 150 | PET-Cu composite current collector | 260 | Al | Ni | 150 |
| Embodiment 15 | 15 | PP | 150 | PI | 334 | Aluminum alloy | Ni | 150 |
| Embodiment 16 | 15 | PP | 150 | PI | 334 | Al | Ni—Cu | 150 |
| Embodiment 17 | 15 | PP | 150 | PI | 334 | Al | Ni | 60 |
| Embodiment 18 | 15 | PP | 150 | PI | 334 | Al | Ni | 500 |
| Embodiment 19 | 15 | PP | 150 | PI | 334 | Al | Ni | 150 |
| Embodiment 20 | 15 | PP | 150 | PI | 334 | Al | Ni | 150 |
| Embodiment 21 | 15 | PP | 150 | PI | 334 | Al | Ni | 150 |
| Embodiment 22 | 15 | PP | 150 | PI | 334 | Al | Ni | 150 |
| Embodiment 23 | 15 | PP | 150 | PI | 334 | Al | Ni | 150 |
| Embodiment 24 | 15 | PP | 150 | PI | 334 | Al | Ni | 150 |
| Embodiment 25 | 15 | PP | 150 | PI | 334 | Al | Ni | 150 |
| Embodiment 26 | 15 | PP | 150 | PI | 334 | Al | Ni | 150 |
| Embodiment 27 | 15 | PP | 150 | PI | 334 | Al | Ni | 150 |
| Embodiment 28 | 15 | PP | 150 | PI | 334 | Al | Ni | 150 |
| Embodiment 29 | 15 | PP | 150 | PI | 334 | Al | Ni | 150 |
| Embodiment 30 | 15 | PP | 150 | PI | 334 | Al | Ni | 150 |
| Embodiment 31 | 15 | PP | 150 | PI | 334 | Al | Ni | 150 |
| Embodiment 32 | 15 | PP | 150 | PI | 334 | Al | Ni | 150 |
| Comparative Embodiment 1 | — | — | — | — | — | Al | Ni | 150 |

TABLE 1A-continued

Preparation parameters and test results of embodiments and comparative embodiments

|  | Thickness of partition plate (μm) | Material of sealing layer of partition plate | Melting point of material of sealing layer of partition plate (° C.) | Material of ion insulation layer of partition plate | Melting point of material of ion insulation layer of partition plate (° C.) | Material of positive tab | Material of negative tab | Thickness of aluminum plastic film (μm) |
|---|---|---|---|---|---|---|---|---|
| Comparative Embodiment 2 | 15 | PP | 150 | PI | 334 | Al | Ni | 150 |
| Comparative Embodiment 3 | 15 | PP | 150 | PI | 334 | Al | Ni | 150 |

NG: The value is not measurable because it fails to reach the target voltage plateau.

TABLE 1B

Preparation parameters and test results of embodiments and comparative embodiments

|  | Quantity of electrode assemblies | Quantity y of tabs | Quantity x of tabs extending out of the packaging shell | Length d1 by which the extending tabs extend outside packaging shell (mm) | Vertical distance d2 between end of non-extending tabs and outer edge of packaging shell (mm) | Energy density of discharging at 0.1 C (Wh/L) | Sealing strength of tab region (N/8 mm) | Manufacturing yield rate (%) | Failure caused by bending |
|---|---|---|---|---|---|---|---|---|---|
| Embodiment 1 | 2 | 4 | 3 | 8 | 10 | 590 | 26 | 97 | No |
| Embodiment 2 | 2 | 4 | 3 | 8 | 10 | 593 | 29 | 95 | No |
| Embodiment 3 | 2 | 4 | 3 | 8 | 10 | 592 | 28 | 95 | No |
| Embodiment 4 | 2 | 4 | 3 | 8 | 10 | 589 | 25 | 97 | No |
| Embodiment 5 | 2 | 4 | 3 | 8 | 10 | 587 | 23 | 96 | No |
| Embodiment 6 | 2 | 4 | 3 | 8 | 10 | 585 | 20 | 96 | No |
| Embodiment 7 | 2 | 4 | 3 | 8 | 10 | 589 | 28 | 97 | No |
| Embodiment 8 | 2 | 4 | 3 | 8 | 10 | 590 | 25 | 96 | No |
| Embodiment 9 | 2 | 4 | 3 | 8 | 10 | 579 | 24 | 96 | No |
| Embodiment 10 | 2 | 4 | 3 | 8 | 10 | 591 | 25 | 97 | No |
| Embodiment 11 | 2 | 4 | 3 | 8 | 10 | 587 | 24 | 96 | No |
| Embodiment 12 | 2 | 4 | 3 | 8 | 10 | 590 | 27.5 | 97 | No |
| Embodiment 13 | 2 | 4 | 3 | 8 | 10 | 588 | 24.5 | 96 | No |
| Embodiment 14 | 2 | 4 | 3 | 8 | 10 | 590 | 26 | 97 | No |
| Embodiment 15 | 2 | 4 | 3 | 8 | 10 | 590 | 26 | 97 | No |
| Embodiment 16 | 2 | 4 | 3 | 8 | 10 | 590 | 26 | 97 | No |
| Embodiment 17 | 2 | 4 | 3 | 8 | 10 | 596 | 21 | 95 | No |
| Embodiment 18 | 2 | 4 | 3 | 8 | 10 | 562 | 33 | 97 | No |
| Embodiment 19 | 4 | 8 | 5 | 8 | 10 | 2353 | 21 | 94 | No |
| Embodiment 20 | 4 | 8 | 6 | 8 | 10 | 2348 | 19 | 94 | No |
| Embodiment 21 | 2 | 4 | 3 | 100 | 10 | 546 | 26 | 92 | No |
| Embodiment 22 | 2 | 4 | 3 | 50 | 10 | 567 | 26 | 95 | No |
| Embodiment 23 | 2 | 4 | 3 | 2 | 10 | 591 | 25.5 | 95 | No |
| Embodiment 24 | 2 | 4 | 3 | 1 | 10 | 592 | 25.5 | 95 | No |
| Embodiment 25 | 2 | 4 | 3 | 8 | 30 | 585 | 25 | 92 | No |
| Embodiment 26 | 2 | 4 | 3 | 8 | 20 | 588 | 25 | 95 | No |
| Embodiment 27 | 2 | 4 | 3 | 8 | 5 | 590 | 26 | 97 | No |
| Embodiment 28 | 2 | 4 | 3 | 8 | 10 | 590 | 26 | 97 | No |
| Embodiment 29 | 2 | 4 | 3 | 8 | 10 | 598 | 26 | 97 | No |
| Embodiment 30 | 2 | 4 | 3 | 10 | 8 | 596 | 26 | 97 | No |
| Embodiment 31 | 2 | 4 | 3 | 2 | 3 | 590 | 25.5 | 95 | No |
| Embodiment 32 | 2 | 4 | 3 | 14 | 6 | 588 | 26 | 97 | No |
| Comparative Embodiment 1 | 2 | 4 | 4 | 8 | — | NG | 32 | — | — |
| Comparative Embodiment 2 | 2 | 4 | 2 | 8 | 10 | 593 | 28.5 | 83 | — |
| Comparative Embodiment 3 | 2 | 4 | 4 | 8 | — | 586 | 23 | 97 | Yes |

NG: The value is not measurable because it fails to reach the target voltage plateau.

As can be seen from Embodiments 1~32 and Comparative Embodiments 1~3 of this application, the design of connecting the opposite-polarity tabs inside the packaging shell and retaining one of the tabs inside the packaging shell improves the manufacturing yield rate of the electrochemical device while effectively increasing the sealing strength of the electrochemical device. In addition, such structural design avoids the risk of failure caused by the bending of the tabs in the serial connection portion and greatly enhances the stability and reliability of the electrochemical device in use.

Evidently, the electrochemical device provided in this application partitions different electrode assemblies and electrolytic solutions into separate electrochemical cells. Different electrochemical cells are ion-insulated from each other to avoid an internal short circuit of the electrochemical device in a liquid electrolyte environment and prevent electrolyte decomposition under a high voltage, thereby improving the safety performance of the electrochemical device and ensuring effective electrical energy output of the electrochemical device. In addition, the design of connecting the opposite-polarity tabs inside the packaging shell and retaining one of the tabs inside the packaging shell effectively increases the sealing strength and the sealing reliability. In addition, voltage can be monitored for a single electrochemical cell, thereby facilitating quick locating of a faulty electrode assembly and identification of the failure cause and improving the product quality and production efficiency of the electrochemical device. In addition, the risk of energy density loss is mitigated, and the material of the electrochemical device is conserved to reduce cost and increase the market competitiveness of the electrochemical device.

The foregoing descriptions are merely exemplary embodiments of this application, but are not intended to limit this application. Any modifications, equivalent substitutions, and improvements made within the spirit and principles of this application shall fall within the protection scope of this application.

What is claimed is:

1. An electrochemical device, comprising:
   a first electrode assembly, a second electrode assembly, and a packaging shell;
   wherein, the first electrode assembly and the second electrode assembly are each located in a separate cavity in the packaging shell, and a first tab from the first electrode assembly and a second tab from the second electrode assembly are connected in the packaging shell, wherein the first tab and the second tab are of opposite polarity;
   wherein the first tab extends out of the packaging shell, and the second tab does not extend out of the packaging shell;
   wherein 1 mm≤d1≤100 mm, wherein d1 is a length by which the first tab extends out of the packaging shell; and
   wherein 0 mm≤d2≤30 mm, wherein d2 is a shortest distance between an end of the second tab and an outer edge of the packaging shell from which the first tab extends out of the packaging shell.

2. The electrochemical device according to claim 1, wherein 5 mm≤d1+d2≤20 mm.

3. The electrochemical device according to claim 1, wherein 2<x≤y−1, wherein x is a quantity of tabs of the electrochemical device extending out of the packaging shell and y is a total quantity of tabs comprised in the electrochemical device.

4. The electrochemical device according to claim 1, wherein the cavity contains a partition plate, and the partition plate comprises an ion insulation layer.

5. The electrochemical device according to claim 4, wherein a material of the ion insulation layer comprises at least one of a polymer material, a metal material, or a carbon material.

6. The electrochemical device according to claim 4, wherein the partition plate further comprises a sealing layer, and a material of the sealing layer comprises at least one of polypropylene, acid anhydride modified polypropylene, polyethylene, ethylene-vinyl-acetate copolymer, ethylene-ethyl-acrylate copolymer, ethylene-acrylate copolymer, ethylene-vinyl-alcohol copolymer, polyvinyl chloride, polystyrene, polyether nitrile, polyurethane, polyamide, polyester, amorphous α-olefin copolymer, or a derivative thereof.

7. The electrochemical device according to claim 4, wherein the partition plate is a bipolar current collector.

8. The electrochemical device according to claim 4, wherein a thickness of the partition plate is 5 μm to 20 μm; and/or
   a melting point of a material of the ion insulation layer is at least 165° C.

9. The electrochemical device according to claim 1, wherein a structure of the electrode assembly comprises at least one of a jelly-roll structure or a stacked structure.

10. The electrochemical device according to claim 1, further comprising a plurality of third electrode assemblies, and the plurality of third electrode assemblies comprise at least two electrode assemblies that are serial-connected, parallel-connected, or serial-parallel-connected to form an electrode assembly group.

11. The electrochemical device according to claim 10, wherein a connection manner relating to the third electrode assembly comprises at least one of: a serial or a parallel connection to the first electrode assembly, a serial or a parallel connection to the second electrode assembly, or a parallel connection to a serial connection portion that comprises the first electrode assembly and the second electrode assembly.

12. The electrochemical device according to claim 10, wherein a connection manner relating to the electrode assembly group comprises at least one of: a serial or a parallel connection to the first electrode assembly, a serial or a parallel connection to the second electrode assembly, or a parallel connection to a serial connection portion that comprises the first electrode assembly and the second electrode assembly.

13. The electrochemical device according to claim 11, wherein only one tab in every two serial-connected tabs extends out of the packaging shell.

14. The electrochemical device according to claim 10, wherein 2<x≤n+3, wherein x is a quantity of tabs of the electrochemical device extending out of the packaging shell and n is a number of electrode assemblies in the plurality of third electrode assemblies.

15. The electrochemical device according to claim 1, wherein the packaging shell comprises at least one of an aluminum plastic film, an aluminum shell, a steel shell, or a plastic shell.

16. An electronic device, comprising an electrochemical device, wherein the electrochemical device comprises a first electrode assembly, a second electrode assembly, and a packaging shell; wherein the first electrode assembly and the second electrode assembly are each located in a separate cavity in the packaging shell, and a first tab from the first electrode assembly and a second tab from the second electrode assembly are connected in the packaging shell, wherein the first tab and the second tab are of opposite polarity:
   wherein the first tab extends out of the packaging shell, and the second tab does not extend out of the packaging shell;
   wherein 1 mm≤d1≤100 mm, wherein d1 is a length by which the first tab extends out of the packaging shell; and
   wherein 0 mm≤d2≤30 mm, wherein d2 is a shortest distance between an end of the second tab and an outer edge of the packaging shell from which the first tab extends out of the packaging shell.

\* \* \* \* \*